United States Patent

Berghager et al.

[11] Patent Number: 5,987,080
[45] Date of Patent: Nov. 16, 1999

[54] METHOD OF SYNCHRONIZING SIGNALS AND A DEVICE HEREFOR

[75] Inventors: Hans Arne Peter Berghager, Älvsjö; Björn Inge Johansson, Täby; Raimo Kalevi Sissonen, Huddinge, all of Sweden

[73] Assignee: Telefonaktiebolaget LM Ericsson, Stockholm, Sweden

[21] Appl. No.: 08/809,635

[22] PCT Filed: Oct. 2, 1995

[86] PCT No.: PCT/SE95/01118

§ 371 Date: Mar. 26, 1997

§ 102(e) Date: Mar. 26, 1997

[87] PCT Pub. No.: WO96/10877

PCT Pub. Date: Apr. 11, 1996

[30] Foreign Application Priority Data

Oct. 3, 1994 [SE] Sweden .............................. 9403328-9

[51] Int. Cl.$^6$ ........................................................ H04L 7/00
[52] U.S. Cl. ........................... 375/354; 375/363; 341/173; 377/33
[58] Field of Search ............................. 375/354, 363, 375/364; 341/173, 178; 377/33; 370/473, 474, 476, 503, 509, 505, 512, 520, 523

[56] References Cited

U.S. PATENT DOCUMENTS

| 4,542,498 | 9/1985 | Bordros ............................. 370/352 |
| 4,819,231 | 4/1989 | Yamada ............................. 375/367 |
| 5,177,482 | 1/1993 | Cideciyan ........................... 341/59 |
| 5,410,754 | 4/1995 | Klotzbach .......................... 370/466 |
| 5,467,347 | 11/1995 | Petersen ........................... 370/230 |

*Primary Examiner*—Chi H. Pham
*Assistant Examiner*—Bryan Webster
*Attorney, Agent, or Firm*—Burns, Doane, Swecker & Mathis, L.L.P.

[57] ABSTRACT

The present invention relates to a synchronization method and to a system for establishing in a signal receiving unit (4) a time position of a significant bit position occurring among received information-carrying bit positions (40a, 40b) into which a predetermined number of uniformly distributed line-code related bit positions are inserted.

12 Claims, 4 Drawing Sheets

RE-SETTABLE 1-BIT REGISTER

Fig. 7

METHOD OF SYNCHRONIZING SIGNALS AND A DEVICE HEREFOR

BACKGROUND OF THE INVENTION

1. Field of the Invention

The present invention relates to a method of establishing in a signal receiving unit a clearly defined digital value of a significant bit position, and on the basis hereof identifying the synchronization of received bit positions and generating therefrom synchronized transferred data packets or data cells occurring as received information-carrying signals, wherein the signal receiving unit is included in a separate signal transfer system.

The invention is based on the occurrence of a bit position that has the logic value "0" or the logic value "1" at each time section or time position. Accordingly, reference is made in the following description solely to "bit position".

A signal transfer system in which the present invention can be applied will include a transmission unit which transmits information-carrying signals that are digitalized through the medium of the values of said bit positions, a signal transfer medium, and a signal receiving unit which receives the information-carrying digitalized signals.

The signal transmission unit is adapted in a known manner to transmit digital information coordinated to form a data packet, and to transmit data packet on data packet or data cell on data cell in an ATM-system with a predetermined number of bit positions in each data packet.

In the following description only "data packet" is referred to.

The following description distinguishes between two categories of "data packet", where a first category of data packet is considered to be a "standardized" data packet and includes a predetermined number of standardized bit positions coordinated to form a number of bytes (data word) and containing address information and/or information-carrying data.

When reference is made in tie following description to "information-carrying" bit positions, these may be address-related or information-carrying.

The present invention is intended more particularly for use in signal transfer systems of the kind which use significant line codes, and even more particularly to systems of the kind in which the line codes are comprised of one bit position (or more bit positions) where the bit positions have one and the same digital value, for instance a logic "0", and occur periodically at time intervals of equal lengths, or a number of bit positions between line-code related bit positions.

More specifically, the system is also based on the assumption that the significant properties of a line code lie in a bit shift which occurs periodically with a predetermined number of information-carrying bit positions therebetween.

This bit shift can be achieved by allocating two bit positions to the line code, i.e. the value "0" and an adjacent value "1", or by assigning solely one bit position to the line code, e.g. the value "0", although in this latter case the system will require a transmitter-related scrambling unit and a receiver-related descrambling unit. (Systematic bit distortion and regeneration).

A data packet thus supplemented with line-code related bit positions forms the second category and is referred to as "a line-code supplemented" data packet.

Although the line code can seize two or more bit positions the following description is based on the assumption that the line code exists as a single bit position, and although the line code can assume one of two digital values, the following description is based on the assumption that the bit position has been allocated the digital value "0".

It is known by the person skilled in this art that the digital value of a bit position can be given the same information content, irrespective of whether the value is "0" or "1", meaning that in the following description of the features of the invention each reference to a digital value "0" can be replaced with the value "1", and vice versa.

In a signal transfer system of the aforesaid kind, the signal receiving unit is adapted to receive digital information which is coordinated to form a data packet and which includes line-code related bit positions.

The signal receiving unit is provided with and/or coacts with first means for establishing a bit shift between two bit positions for each of a number of line-code related bit positions, and a second means for removing solely said line-code related bit positions and, in relation to their time positions, time-synchronize the data flow and further transmit "standardized" data packets.

2. Description of the Background Art

Several different designs of signal transfer systems which include a transmitter unit which transmits information-carrying digitalized signals, a transfer medium for transferring said signals, and a signal receiving unit for receiving transmitted information-carrying digitalized signals are known to the art.

The present invention relates more particularly to a signal transfer system of the kind in which the signal transmitting unit is adapted to transmit information-carrying data packets and to transmit data packet on data packet.

A predetermined number of line-code related bit positions are introduced to and in each "standardized" packet via the transmitting unit, so as to form a "line-code supplemented" data packet.

A system of this kind requires a predetermined value for each selected line-code related bit position (such as "0" or "1"), the selection of a number of coordinated line-code related bit positions (one or two, or more in exceptional circumstances), selection of the time distance (the number of information-carrying bit positions) between each line-code related bit position so that these will be equal to and adapted directly in dependence on (or independently of) chosen data packet limits.

It will be assumed in the following description that such a line-code supplemented data packet will be comprised of a number of subsections where a first subsection may have twenty four bit positions belonging to the information-carrying data packets with digital values corresponding to the information content, followed by a line-code related bit position assigned the digital value "0", followed by a subsection which also has twenty four information-carrying bit positions, followed by a line-code related bit position, and so on, so as to form from a number of complete subsections at least one data packet of the line-code supplemented kind, such data packets normally occuring in series.

In signal transmission systems of the aforesaid kind line-code related bit positions are introduced periodically into the transmission unit, and the signal-receiving unit includes means capable of synchronizing with the bit stream and capable of synchronizing the data packets by evaluating the line-code positions, and removing solely said line-code related bit positions so that only information-carrying digital signals will be forwarded from the signal-transmitting system as a standardized data packet.

It is also known that the transmission properties of the medium used can be improved by inserting line-code related bit positions.

Because the line-code related bit positions appear periodically and have one and the same digital value, and because the separate bit positions are predictable when transmitted, the information-carrying digitalized signals form a periodic serial structure which enables transmission properties to be improved by improving reception conditions in the receiver.

Reference is made to the publication "Digital Telephony" Second edition, pages 165–179 "Digital Transmission and multiplexing" by John Bellamy (ISBN 0-471-62056-4) as an example of present day technology.

Particular reference is made to pages 171, 172, which disclose provisions for "Bit insertion", which is the technique used by the present invention.

Various methods and devices have been proposed for establishing the bit-positions of a line code.

It is also known to structure each line-code supplemented data packet received in the receiver into subsections which each include a number of similar bit positions, wherein each subsection includes a chosen number of information-carrying bit positions and one bit position, or several bit positions, as a line code. The present invention is also based on this technique.

This method of structurizing and storing a large number of subsections, namely a number of such magnitude as to ensure very definitely that each information-carrying bit position in a subsection will have been allocated a digital value ("1") which differs from the chosen line-code value ("0") at least once, enables the time position of the line code to be evaluated by reading the bit positions of each subsection and proceeding on the assumption that the line code will be represented by the sole sequential bit position whose value has not changed. Structuring of the subsections in this way will mean that inserted line codes will occur in the same time positions in each subsection.

Received bit positions and data packets can then be synchronized to the time positions of the line code and the standardized data packet can be forwarded with the bit positions and the data packets synchronized in relation to a synchronizing signal.

Alternatively, each incoming bit position can be counted with the aid of a bit position counter while establishing whether or not similarly located bit positions in each subsection have the same digital value as the selected digital value of a selected line code in a predetermined number of subsections.

If it can be established that similarly located bit positions of a chosen number of subsections have the same values as the line code, it can be assumed that the time position of the line code has been established.

If such is not the case, the bit position counter will jump one step and repeat the searching procedure until all bit positions of the line code and their time positions have been found.

When considering the present state of the art as described above and when taking into consideration that the signal receiving unit used must be provided with and/or cooperate with first means so as to establish a time position between or related to two time positions of a number of line-code related bit positions, and second means for removing solely said line-code related bit positions and, in relation to their time positions, time-synchronized "standardized" data packets and their associated bit positions, it will be seen when considering the necessity of dividing the information-carrying and line-code supplemented signals or data packets received by the signal receiving unit into a number of different subsections a problem exists in evaluating the digital value of each information-carrying bit position so as to enable the bit positions of a line coded to be evaluated very quickly.

It will also be seen that a technical problem resides in providing conditions such that the bit positions of the line code will be apparent immediately the information-carrying bit positions in a time section or time position in evaluated subsections has been allocated a digital value ("1") which differs from a chosen line-code value ("0").

Another technical problem resides in providing conditions which enable the bit positions of the line code to be evaluated without needing to overdimension the choice of the number of subsections, in the aforesaid "very definite" concept.

A technical problem also lies in realizing the significance of and the advantages afforded by allowing the digital value of each evaluated information-carrying bit position to influence a 1-bit register that can be set to "0" or "1", and to include this re-settable 1-bit register in a ring-coupled shift register, with a number of 1-bit registers corresponding to the number of time positions or bit positions in said subsections.

It will also be seen that a technical problem is one of realizing the significance of setting all 1-bit registers in the ring-coupled shift register to an initial setting such that all said 1-bit registers will adopt a digital value that corresponds to the digital value of the chosen line code, such as "0".

A technical problem associated herewith resides in realizing the significance of permitting respective bit positions in the information-carrying signals differing from the digital value of a chosen line code to reset the adjustable 1-bit register to a state which differs from the line code, such as to "1", or vice versa, at a time point which corresponds to the relevant time position of the bit position.

It will also be seen that a technical problem resides in realizing the significance of choosing the number of 1-bit registers to correspond to the number of bit positions in a subsection structured with a corresponding number of information-carrying bit positions and to the number of bit positions in a used line-code, and with a number of re-settable 1-bit registers that corresponds to the number of incoming conductors.

In the case of a shift register of this kind where the digital content of a 1-bit register is shifted to an adjacent 1-bit register between each bit position, with the number of re-settable 1-bit registers corresponding to the number of incoming conductors, a technical problem resides in realizing the advantages that are afforded when it can be concluded that when the shift register shifts solely one line-code related bit position around the ring this sole bit position is representative of the line code.

Another technical problem resides in realizing the significance of and the advantages afforded by the use of a control circuit which is able to read the bit-position values in said ring-coupled shift register and also to point out the bit position which alone carries a line-code related value and whose time position can therefore be assumed to be representative of the line-code position in each subsequent subsection.

Another technical problem resides in realizing the advantages that are afforded by using a control circuit which can be controlled to establish the line-code bit positions and to establish therefrom a time position which corresponds to a synchronous reference and activate a synchronizing unit and therewith produce a synchronized time position related to the line code position.

It will also be seen that a technical problem resides in realizing the significance of permitting the control circuit to activate means for removing the line code positions when the line-code supplemented data packets received by the signal receiving unit are to be forwarded to another signal receiving unit as standardized signals and data packets, i.e. signals and data packets that are not line-code supplemented.

A further technical problem resides in creating a ring-coupled shift register for the purpose intended, wherewith the functional principles of the shift register can be utilized both in the serial transmission of bit positions and in the parallel transmission of bit positions, constructing data packets having line-code related bit positions.

SUMMARY OF THE INVENTION

With the intention of solving one or more of the aforesaid technical problems, there is proposed in accordance with the invention a method of establishing in a signal receiving unit a time position in which a significant bit position occurs among received information-carrying digitalized signals, wherein the signal receiving unit is included in a signal transfer system which comprises a transmitter unit which transmits information-carrying signals that have been digitalized via the values of the bit positions, a signal transfer medium, and a signal receiving unit which receives the transmitted information-carrying digitalized signals.

The signal transmitting unit shall be adapted for transmission of packet-coordinated digital information via sequential bit positions and for transmitting data packets on data packet and wherein a predetermined number of uniformly distributed line-code related bit positions are inserted in the bit positions of each data packet with a predetermined number of information-carrying bit position between mutually adjacent line-code related bit positions.

The signal receiving unit is adapted to receive inserted line-code related bit positions which are coordinated to data packets and which contain digit information, wherein said signal receiving unit is provided with and/or coacts with first means for establishing the time positions of received bit positions, wherein information-carrying and line-code related bit positions received in the signal receiving unit can be divided into a number of equal subsections with a predetermined number of said subsections forming a complete data packet with inserted line-code related bit positions, and wherein said line-code related bit positions are each allocated one and the same significant digital value.

It is proposed in accordance with the present invention;

a) that a number of 1-bit registers belonging to the receiving unit are mutually coupled to form a ring-coupled shift register, wherein said 1-bit registers are initially allocated digital values which correspond to the digital value of a chosen and transmitted line code;

b) that the number of 1-bit registers corresponds to a chosen number of bit positions in each subsection;

c) that a stream of bit positions and their respective digital values which can be comprehended by the receiving unit are compared with the relevant digital value stored in a re-settable 1-bit register;

d) that a digital value of a bit-position that differs from the line-code value sets the 1-bit register to said differing value;

e) that when only one 1-bit register presents a digital value that corresponds to the digital value of the line-code this value represents the value of the line-code time position, and f) that synchronization is effected in accordance herewith.

It is proposed in accordance with embodiments which lie within the scope of the invention that there is used a control circuit capable of reading the bit-position values in said 1-bit register and pointing-out the bit position or time position that has the same value as a selected line code.

The control circuit used shall be capable of activating a synchronizing unit and give a synchronizing time position related to the line code position, and also of activating means for removing the line code positions.

The invention also relates to a system for establishing in a signal receiving unit a time position at which a periodically occurring significant bit position having a specific digital value in the form of a line code appears among several received information-carrying signals.

The invention also proposes the use in one such system of a number of time-position and bit-position related 1-bit registers coupled to form a ring-coupled shift register, and that the 1-bit registers are allocated initially digital values which correspond to the digital value of said significant bit position, and that the number of 1-bit registers used corresponds to the number of bit positions in a subsection of a line-code supplemented data packet, said system including means for comparing the digital value of a first occurring bit position with the instant digital value in a re-settable 1-bit register, the digital value of a next occurring bit position with the digital value that now exists in said re-settable 1-bit registers, and so on.

The system also includes a means which functions to change the digital value in the re-settable 1-bit register immediately the digital value of a bit position differs from the value initially inserted in the register, wherein when only one initial digital value is moved around the 1-bit registers this position is taken as representing the time position of a line code The system also includes a control circuit which functions to read the digital value of each shift register.

The control circuit is also adapted to activate a synchronizing unit.

In addition, the control unit also functions to activate a circuit which functions to eliminate line-code time positions.

Those advantages that are primarily afforded by an inventive method and an inventive system reside in the provision of conditions whereby a receiving unit is able to establish reliably and quickly all time positions that cannot constitute a line code and therewith produce the time position of the line code and eliminate said line-code time position when standardized data packets are to be forwarded to another receiver or like device.

The main characteristic features of an inventive method are set forth in the characterizing clause of the following claim 1, while the main characteristic features of an inventive system are set forth in the characterizing clause of the following claim 5.

BRIEF DESCRIPTION OF THE DRAWINGS

A signal transmission system having features which are significant to the present invention and which is at present preferred will now be described in more detail with reference to the accompanying drawing, in which.

DETAILED DESCRIPTION OF THE INVENTION

Figure 1:
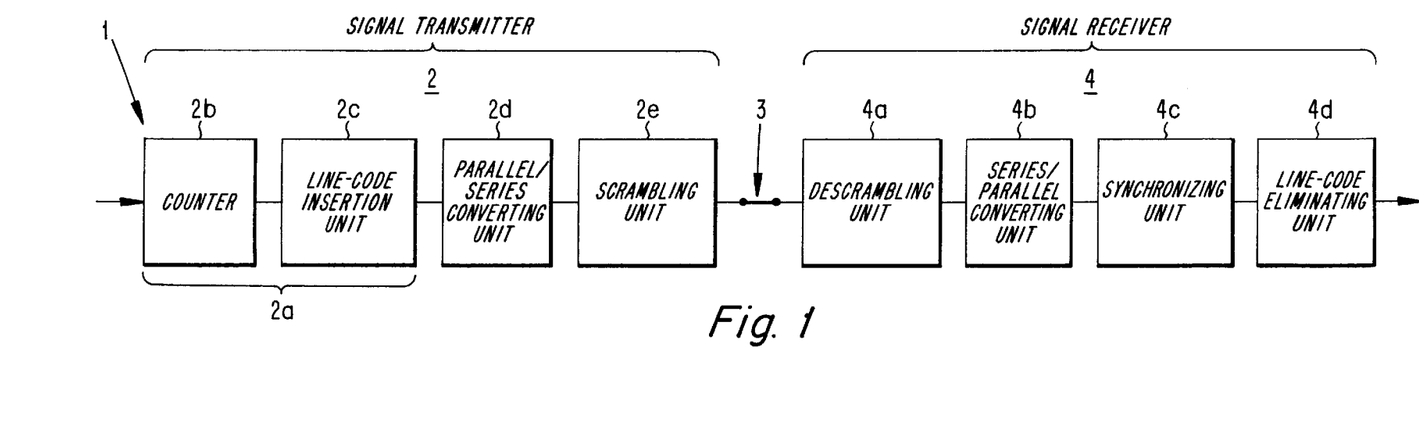
FIG. 1 illustrates schematically a transmitter unit, a receiver unit and a signal transfer medium connecting said units.

FIG. 1 illustrates schematically a signal transmission ATM-system 1 which includes a signal transmitter unit 2 which transmits information carrying signals that are digitalized via the values of bit positions, a signal transfer medium 3, and a signal receiving unit 4 which receives the information-carrying, digitalized signals.

The signal transmitting unit 2 includes a signal receiver 2a which functions to receive information-carrying digitalized signals that are structured as a standardized data cell in an ATM-system. Bit positions are counted in a counter 2b.

The bit positions are synchronized and each of said bit positions can be considered to represent a time position.

The signal transmitting circuit shall include a known line-code insertion circuit 2c, when necessary a parallel/series converting unit 2d, and a scrambling unit or bit distortion unit 2e which functions as a feedback shift register.

Since the principle construction of the circuits is known to the art, they will not be described in more detail here.

It is mention, however, that the insertion of a bit position as a line code requires a periodic bit shift in the bit stream, this bit shift being effected by using "0" and "1" as bit shifting positions.

For illustrative purposes however, the invention is described with reference to the use of solely one bit shifting position, which is allocated the value "0".

In accordance herewith, there is required a bit distorting unit or scrambling unit 2e which is constructed so that "0" in a bit position will result in a bit shift, whereas "1" will not result in a bit shift of the digital value. A corresponding regenerating or descrambling unit 4a is required in the signal receiver 4, as described in more detail hereinafter.

The unit 2e and the unit 4a are known to the art and will not therefore be described in detail here.

The transfer medium 3 may have the form of a physical conductor or an optical conductor, this latter case requiring the use of electro-optical and opto-electrical converters in a manner known per se, not shown.

The receiver 4 includes a signal receiving circuit 4a in the form of a feedback shift register, to form a descrambling unit with requirement of a series/parallel converter unit 4b, a synchronizing unit 4c and a line-code eliminating unit 4d.

Since the principle constructions of these circuits is known to the art, they will not be described in detail here.

The signal transmitting unit 2 is thus constructed to receive digital information that is coordinated to standardized ATM-data cells and to further transmit digital information coordinated to line-code supplemented ATM-data cells.

Figure 2:
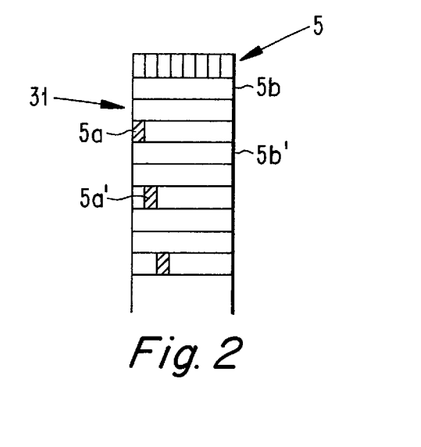
FIG. 2 illustrates structuring of data packets transmitted by the transmitter win added or inserted line-code related bit positions in synchronism.

There is inserted in each line-code supplemented data cell 5 a predetermined number of line-code related bit positions, referenced 5a, 5a' i FIG. 2, and a predetermined number of information carrying positions 5b between adjacent line-code related bit positions 5a, 5a'.

The line-code supplemented data cell 5 of FIG. 2 is structured such that twenty four information-carrying bit positions 5b are followed by one single line-code related bit position 5a, and so on.

The twenty four information-carrying bit positions 5b and the single line-code related bit position 5a form a subsection, such as subsection 31, and a predetermined number of such subsection 31, 32, 33 form said data cell 5.

It will be noted that each bit position of the information-carrying bit positions 4b can have the digital value "1" or the digital value "0" and that the receiving unit 4 shall be able to detect and evaluate the digital value of each bit position.

However, each line-code related bit position 5a adopts only one digital value "0", which is predetermined and system determined.

The system also determines that the line code shall occur with each 25th bit position.

Figure 3:
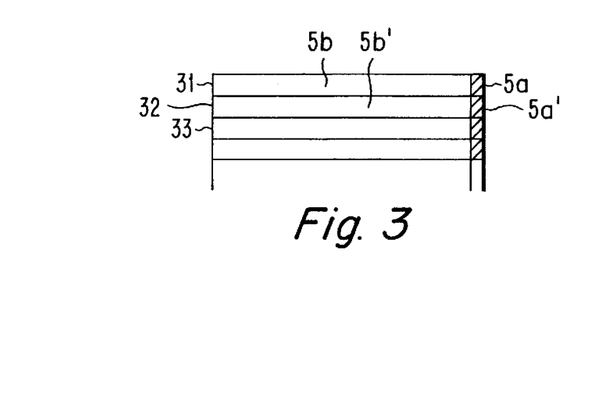
FIG. 3 illustrates data packets with synchronized line-code related bit positions received by the receiver unit and is intended to illustrate schematically a known method of establishing the time position of the line code.

It is known to establish the time position of the line-code related bit positions in the receiver, by structurizing received bit positions in subsections in the receiving unit 4 in a memory that has twenty five bit positions in each subsection 31, 32, 33, in the manner shown in FIG. 3. The positions 5a and 5a' will therewith always be orientated adjacent to (and above) one another.

In the illustrated case it is assumed that with synchronism these will be positioned last in each subsection, although it will be noted that when the system is out of synchronism the line-code related bit positions will occur during other time sections, although orientated above one another, therewith enabling the synchronizing bit position to be evaluated and synchronism regenerated.

The illustrated method of structurizing the subsections and storing said subsections assumes the evaluation of subsection 31, 32, 33 in such large numbers as to be able to assume very definitely or with a high degree of probability that among the received bit positions in the evaluated subsections no bit position will have information-carrying digital values in similarly located time sections that correspond to the line code, since in such case several line-code initiating time positions will exist.

Thus, when proceeding in accordance with this method there is required a number of subsections 31, 32, 33 that correspond to a plurality of complete data cells.

The bit positions 5a and 5a' shall be eliminated or removed when forwarding standardized data cells from the receiver 4.

This can be effected in principle with the aid of known means.

Figure 4A:
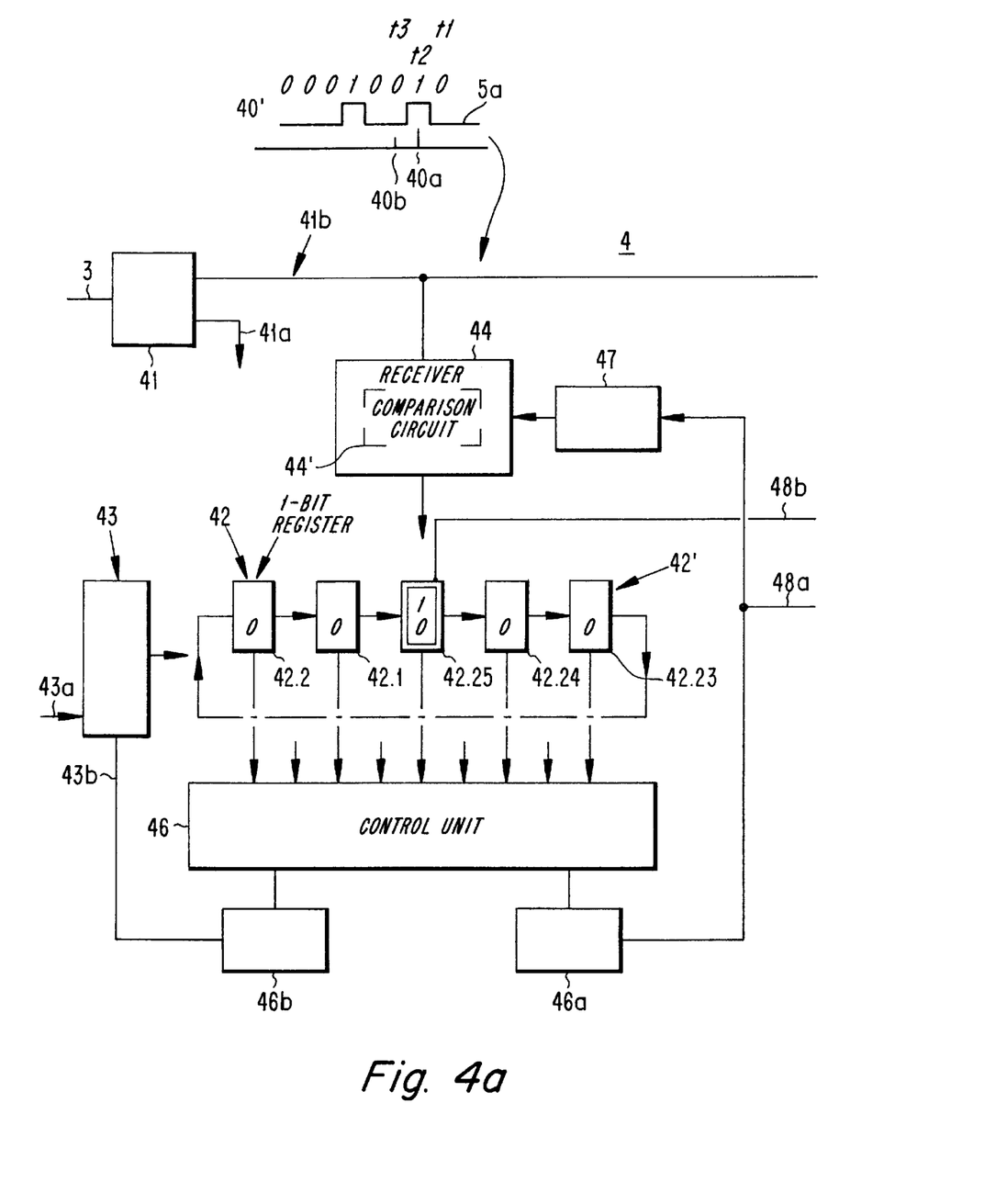
FIGS. 4a and 4b are block schematics which are intended to illustrate a first embodiment of the invention in conjunction with a bit stream occurring serially on a conductor.
Figure 4B:
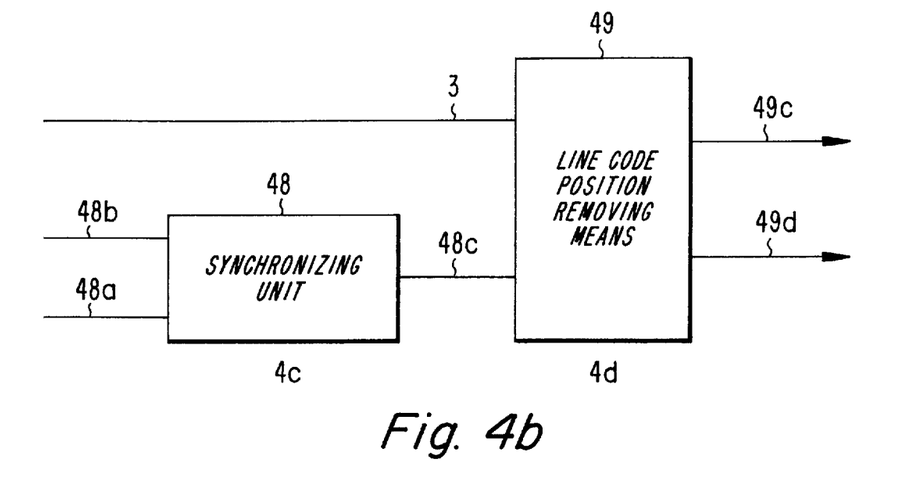

FIGS. 4a and 4b are block schematics which illustrate the components of a receiving unit 4 in accordance with the invention.

It is assumed in the illustrated case that the digital signal flow on the medium 3 has a serial structure, which is shown only partially in FIG. 4 with the line-code related bit position 5a drawn as a first bit position having the value "0", followed by an information-carrying bit position 40a in the form of a logic "1" and a further bit position 40b in the form of a logic "0".

The principle function of the invention can be illustrated adequately by describing the sequence during said three time sections $t_1$, $t_2$, $t_3$, and the bit positions 5a, 40a, 40b related thereto.

Line-code supplemented data cells enter in serial form on the conductor 3. Each bit position is timewise related in the receiver 4 and the bit-position transmission rate can be recovered as a pulsated signal via this relationship, this signal in turn being able to serve as clock pulses.

In order to enable a signal receiving unit 4 to rapidly establish the time position "$t_1$" in which a significant line-code related bit position 5a occurs among a plurality of received information-carrying bit positions such as the bit positions 40a, 40b, occurring in other time sections "$t_2$" and "$t_3$", the aforesaid signal receiving unit shall be provided with and/or coact with first means 41 functioning to establish time positions of received bit positions.

The means 41 receives the bit positions via the transfer medium 3 and, on the basis thereof, generates clock pulses on a conductor 41a and a line-code supplemented bit stream 40' on a conductor 41b.

The signal receiving unit 4 includes a second means 42 in which received information-carrying and line-code provided bit positions (41b) can be divided into a number of similar subsections.

Clock pulses on the conductor 41a evaluated in the first means 41 shall be delivered to circuits in the signal receiving unit 4 in a manner known to the skilled person and therefore not described in detail here.

The aforesaid second means 42 is comprised of a number of 1-bit registers, namely twenty five 1-bit registers, referenced 42.1–42.25 and mutually coupled to form a ring-coupled shift register 42'.

The shift register 42' functions to shift the digital content of a 1-bit register 42,25 for each time position $t_1$, $t_2$, $t_3$ to an adjacent 1-bit register 42.24, and so on.

One of these 1-bit registers, namely the 1-bit register referenced 42.25, is a re-settable 1-bit register, and consequently only the digital value of this register can be shifted to a logic "1", through the medium of external circuits.

The number of 1-bit registers 42.1–42.25, including the resettable bit register (42.25), shall correspond to the number of bit positions in a chosen subsection (such as the subsection 31).

A predetermined number of said subsections shall form a line-code supplemented data cell with applied line-code related bit positions separated by twenty four information-carrying bit positions.

A digital value corresponding to the digital value "0", which is system chosen for transmitted line codes, is initially allocated to each 1-bit register 42.1–42.25 by a third means 43 included in the receiving unit 4.

This activation may be effected primarily by a signal appearing on a conductor 43a and generated in an external control equipment.

All 1-bit registers 42.1–42.25 may also be activated to a 0-setting via another conductor 43b.

The time position of the line code "0" is now evaluated on the basis of the initial "0"-setting of all 1-bit registers 42.1–42.25.

This is effected principally by first establishing and marking all bit positions in subsection after subsection that can not constitute a line code. This is based on the fact that solely the twenty four information-carrying bit positions and their respective time positions are able to adopt both the digital value "0" and the digital value "1", whereas the line code is able to adopt only the value "0".

The invention is based on shifting one and the same re-settable 1-bit register in the shift register 42' to the logic value "1" at each bit position at which an information-carrying bit position has the digital value "1".

As soon as one of these information-carrying bit positions shows the logic value "1" at any time during the search procedure, this is registered in the shift register 42' and if a corresponding bit position in the next arriving subsection also shows a logic value "1" the re-settable 1-bit register 42.25 will not be reset, because this has already been done.

When only one logic value "0" is shifted round through the 1-bit registers of the shift register 42', the time position of the line code is made apparent, namely as the time position that is shifted round by the 1-bit registers and which corresponds to the logic value "0".

The re-settable 1-bit register 42.25 is changed as a result of a receiver 44 receiving a stream 40' of bit positions and their digital values that can be interpreted or understood by the receiving unit 44. The receiver 44 includes a comparison circuit 44' which compares the digital value "0" of the bit position 5a with the digital value "0" of the re-settable 1-bit register 42.25 during the time section "$t_1$".

The same digital value lie in the time section "$t_1$" and therewith no change in the digital value "0" of the register 42.25 is initiated.

The shift register 42' now steps forward one step, wherewith the digital value "0" in the 1-bit register 42.25 is transferred to the 1-bit register 42.24 as a logic value "0", the digital value "0" of the 1-bit register 42.1 is shifted to the re-settable 1-bit register 42.25, and so on.

The digital value "1" of the information-carrying bit position 40a is now compared in the next time position $t_2$ with the digital value "0" of the re-settable 1-bit register 42.25.

There is now a difference, wherein the comparison circuit 44' initiates a change of the digital value of the 1-bit register 42.25 to a logic "1".

The shift register 42' is now stepped forward a further step, wherein the digital value "0" in the 1-bit register 42.24 is transferred or steeped to the 1-bit register 42.23, the digital value "1" in the 1 bit register 42.25 is transferred to the 1-bit register 42.24 and the digital value "0" in the 1-bit register 42.1 is transferred to the re-settable 1-bit register 42.25.

No change in the content of the 1-bit register 42.25 is made with regard to the digital value "0" during the time position $t_3$ of the information-carrying bit position 40b.

As the bit positions and their digital values pass in a bit stream 40', the shift register 42' is stepped forwards at the same rate and whenever an information-carrying bit position in a time position shows the logic value "1", this value is inserted into the 1-bit register 42.25, wherein said digital value "1" is shifted around the shift register and constantly seizes a time position which is unable to correspond to the time position of the line code.

Should the bit stream 40' include in any time position a bit position having a logic value "1" and the 1-bit register 42.25 is already set to the value "1", the 1-bit register 42.25 will not be re-set, and the value "1" is only shifted further through the shift register 42'.

Each digital value in the bit stream 40' that differs from the value of a chosen line code is stored in a register position corresponding to the time position of the bit position, through the medium of said circuit 44' and through the medium of shifting of the digital values of the 1-bit registers corresponding to the bit stream 40'.

Each 1-bit register 42.1–42.25 can be assumed to represent a time position in the section 31, the section 32 and so on.

By receiving the digital value of bit position on bit position in this way and stepping forwards the shift register 42' at the same date and constantly setting the re-settable 1-bit register 42.25 to a logic value "1" when the bit position of the bit stream 40' has the logic value "1" and not changing the 1-bit register 42.25 when its logic value is "1" and the bit positions have the logic value "1", the information-carrying bits will quickly set the 1-bit register 42.25 to its logic "1" state.

The logic value "0" corresponding to the line-code time position (5*a*) will constantly be shifted around the register and will always meet the same value (5*a*') at the input position or the re-settable 1-bit register 42.25 and this value will never change its state.

All 1-bit registers in the shift register 42' will be changed to the logic-"1" state very quickly and shift around the logic "1" s with the exception of one single time position, this position thus representing line codes.

A control circuit 46 detects the digital value of each 1-bit register and detects that only one logic value "0" is shifted around the register, this detection being effected by a circuit 46*a*.

The circuit 46*a* then activates a circuit 47 which functions to stop the search and a unit 48 is then informed of the shifting of solely one value "0".

A circuit 46*b* detects whether or not all 1-bit registers have the digital values "1". If such is the case, this denotes a fault or error and the searching procedure is repeated, by setting all 1-bit registers to logic "0", via conductor 43*b*.

Figure 5:
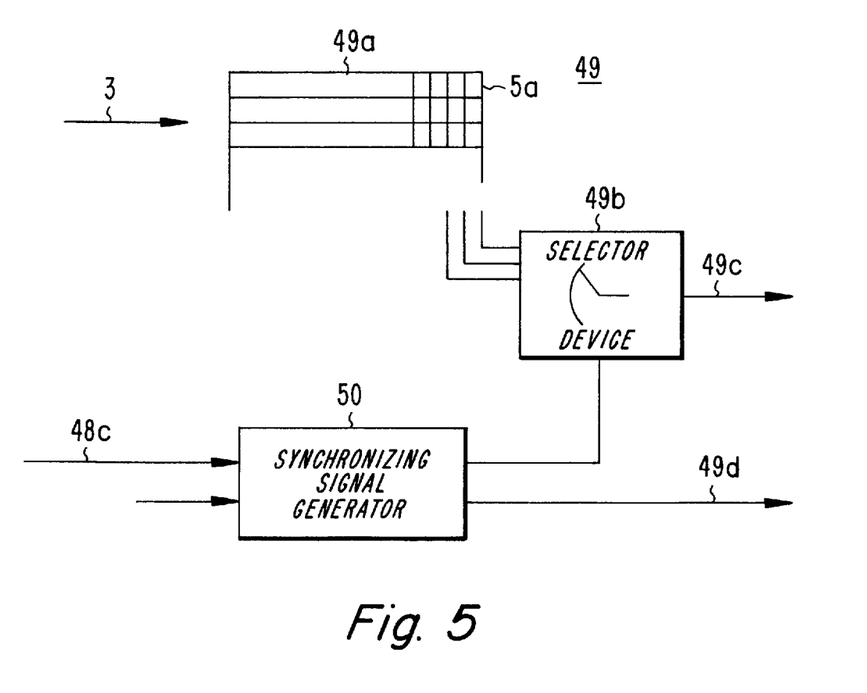
FIG. 5 is a block schematic which illustrates a line code eliminating unit.

The control circuit 46 now activates a synchronizing unit 48 (4*c*) through the medium of circuit 46*a*, and produces a synchronizing time position related to the line-code position and activates means 49 for removing or eliminating the line-code positions In the FIG. 5 embodiment, the means 49 has the form of a memory 49*a* which stores subsection line-code related data cells.

A selector device 49*b* selects those bit positions that are to be forwarded on a conductor 49*c* and leaves the line-code position 5*a*.

A synchronizing signal is produced on conductor 49*d*, through the medium of a unit 50.

When practicing the principles of the present invention it has been found possible in practice to detect and clearly establish line-code time positions in one single ATM-cell-time in the majority of applications.

The principles of the invention can also be applied to locate cell limits with the aid of synchronizing blocks, not shown.

Because there will often occur a number of bit positions that have a value opposite to the value of the line code and limited to the information-carrying bit positions, the line code position is quickly evaluated. The evaluation time can be shortened still further, by transmitting known bit patterns of the information-carrying bit positions on the transfer medium 3.

Figure 6:
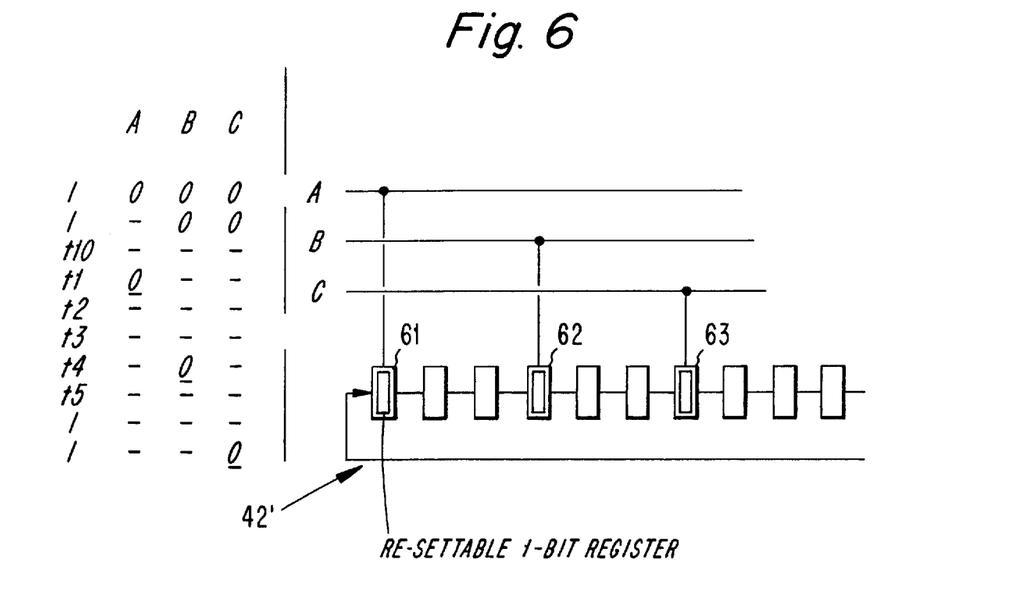
FIG. 6 is a block schematic which illustrates a second embodiment of the invention in which parallel bit streams occur on three conductors.
Figure 7:
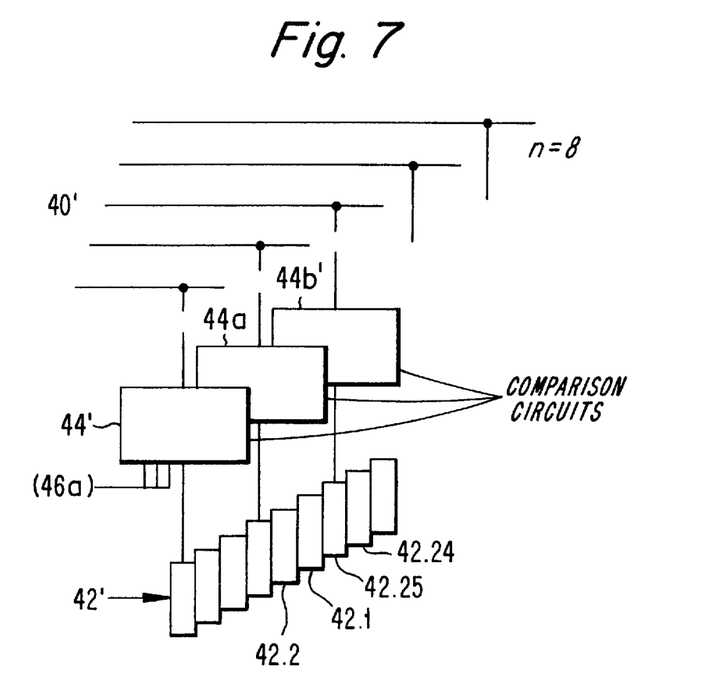
FIG. 7 is intended to illustrate an embodiment with parallel bit streams occurring on eight conductors.

FIGS. 6 and 7 illustrate the principles of a parallel link. There is used in this case a similar ring-coupled shift register 42', although with the same number of input positions or re-settable 1-bit registers, similar to the 1-bit register 42.25, as there are parallel data bits in the link.

The re-settable 1-bit registers shall be distributed uniformly around the shift register. It is necessary that the number of bit positions between two line-code related bit positions can be divided evenly by the number of parallel data bits in the link.

FIG. 6 illustrates an embodiment with three parallel data bits in a link, whereas FIG. 7 illustrates eight parallel data bits in a link.

In the case of the FIG. 6 embodiment, when nine data-bit positions are located between two line-code related bit positions (with reference "0"), the parallel links A, B and C may consist of three bits. The input positions or re-settable 1-bit registers will then be three in number, reference 61, 62, 63 in the illustrated case.

Each third 1-bit register in the ring then comprises a resettable 1-bit register, which constitutes an input position. Structuring of the bit positions at time sections $t_1$–$t_{10}$ is also shown i FIG. 6 with the links A, B and C.

The line code occurs on link A at time position $t_1$, on link B at time position $t_4$ and on link C at time position $t_7$.

In other regards reference is made to FIG. 7, which illustrates an exemplifying embodiment that includes twenty four data-bit positions between two line-code related bit positions and in which the parallel link may consist in eight bits. The input positions or re-settable 1-bit registers (42.25) are then eight in number.

Each third 1-bit register in the ring will then be an resettable 1-bit register and constitutes an input position, with the exception of one location at which a fourth 1-bit register becomes the input position. The principle is then the same.

All 1-bit registers are controlled by the same clock pulse The bit position in the ring that rotates with the value of the line-code bit reaches an input position on each third clock cycle and has then been shifted laterally one bit in relation to the parallel link.

A supervising circuit or initiation circuit, such as circuit 43, is also necessary in this case, in order for all values of the 1-bit registers in the ring to be set to the line-code value when the search begins. When all bits have assumed a value opposite to the line-code value with the exception of one bit, the search is complete and the position of the line code known.

Although the embodiment illustrated in FIG. 7 functions in principle in the same manner as the FIG. 4 embodiment, bit positions appear on eight conductors 40' leading to each of the comparison circuits 44', 44*a*', 44*b*', each of which is connected to a respective 1-bit register, said registers being a part in forming a ring-coupled shift register 42'.

A circuit 46*a* functions to determine that a search has been completed, as soon as the ring-coupled register 42' shows that one single value "0" is shifted around the ring.

If the search is continued further, there is a danger that a possible bit error will extinguish the last rotating bit position that has the value "0". Should a bit error result in all the values of the bit positions being extinguished in the search, this will be detected in a circuit 46*b* and the search then re-started.

When the bit positions of the line-code are known, the subsections that are separated by the link code bits can be formed into a desired format.

Since the subsections of the data packets are known, the synchronization of data cells can be commanded in a conventional manner, for instance by pattern recognition in data cells, CRC etc..

The aforesaid scrambling unit enables one single bit position to represent the line code.

Since each bit position which is "0" produces a bit shift, it is guaranteed that the line code "0" will result in one such bit shift.

The bit shift shall be related to adjacent information-carrying bit positions.

It will be understood that the invention is not limited to the aforedescribed and illustrated exemplifying embodiments thereof and that modifications can be made in the scope of the inventive concept as illustrated in the following claims.

We claim:

1. A method of synchronizing a signal transfer system, comprising a signal transmitting unit for transmitting digitalized information-carrying signals, a signal transfer medium and a signal receiving unit for receiving said transmitted digitalized information-carrying signals, by establishing, in the receiving unit, a time position in which a significant bit position occurs among received information-carrying digitalized signals, the method comprising the steps of:

mutually coupling a number of 1-bit registers belonging to the receiving unit to form a ring-coupled shift register, wherein said 1-bit registers are initially allocated digital values which correspond to the digital value of a chosen and transmitted line code, said number of 1-bit registers corresponding to a chosen number of bit positions in each subsection;

comparing a stream of bit positions and their respective digital values which can be comprehended by the receiving unit with the relevant digital value stored in a resettable 1-bit register; and setting the 1-bit register to a differing value by a bit-position having a digital value that differs from a line-code value, the differing value being the digital value wherein, when only one 1-bit register presents a digital value that corresponds to the digital value of the line code, the digital value represents the value of the line-code time position, wherein the signal transmitting unit is adapted to transmit digital information having predetermined bit positions and coordinated to form data packets in the form of sequential bit positions and to transmit data packets on data packets, a predetermined number of uniformly distributed line-code related bit positions being inserted in the bit positions of each data packet with a predetermined number of information-carrying bit positions between mutually adjacent line-code related bit positions, and the signal receiving unit is adapted to receive inserted line-code related bit positions which are coordinated to data packets and which contain digital information, the receiving unit including first means for establishing the time positions of a number of line-code related significant bit positions, the information-carrying and line-code related bit positions received in the signal receiving divisible into a number of equal subsections with a predetermined number of the subsections forming a complete data packet with inserted line-code related bit positions, and the line-code related bit positions are each allocated one and the same significant digital value.

2. The method of claim 1 further comprising:

reading the values of the bit positions in said shift register with the aid of a control circuit; and evaluating the lone time position that has the same value as the line code.

3. The method of claim 1, further comprising:

activating a synchronizing unit with the aid of said control circuit; and giving a synchronizing time position related to the line code position, wherein said control circuit activates means for eliminating the line code positions.

4. The method of claim 1, further comprising:

periodically introducing a line-code related bit position into transmitter information-carrying signals with the aid of a signal transmitting unit, with said line-code related bit positions having mutually the same digital values.

5. A system for establishing a time position in a signal receiving unit, the time position being represented by a periodic occurrence among received information carrying bit positions of a significant bit position having a specific digital representation of a line code, said system comprising:

a means having a number of 1-bit registers that are initially allocated digital values which correspond to the digital value of said significant bit position, wherein the number of 1-bit registers corresponds to the number of bit positions in a subsection of a data packet provided with a line code and the 1-bit registers are ring-coupled to form a shift register;

a comparing means for comparing the digital value of each occurring bit position with a digital value in an re-settable 1-bit register; and changing means for changing the digital value of a 1-bit register whenever the digital value of a bit position differs from the value initially inserted wherein when only one register in the ring-coupled 1-bit registers exhibits the initially inserted digital value, this bit position is taken to constitute the line-code time position.

6. A system according to claim 5 further comprising a control circuit for reading the digital value of each 1-bit register.

7. A system according to claim 6, wherein said control circuit activates a synchronizing unit.

8. A system according to claim 5, wherein said control circuit activates a circuit for removing line-code bit positions.

9. A method according to claim 2, further comprising:

activating a synchronizing unit with the aid of said control circuit; and giving a synchronizing time position related to the line code position, wherein said control circuit activates means for removing the line code positions.

10. A method according to claim 2, further comprising:

periodically introducing a line-code related bit position into transmitter information-carrying signals with the aid of a signal transmitting unit, said line-code related bit positions having mutually the same digital values.

11. A method according to claim 3, further comprising:

periodically introducing a line-code related bit position into transmitter information-carrying signals with the aid of a signal transmitting unit, said line-code related bit positions having mutually the same digital values.

12. A method according to claim 9, further comprising:

periodically introducing a line-code related bit position into transmitter information-carrying signals with the aid of a signal transmitting unit, said line-code related bit positions having mutually the same digital values.

* * * * *